Jan. 10, 1939. C. R. COPELAND 2,143,054
LIVE BAIT FISHHOOK
Filed July 5, 1938
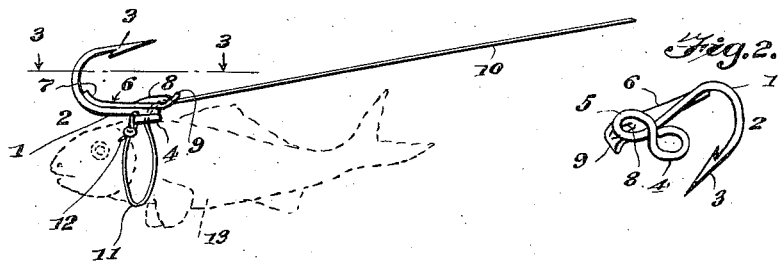
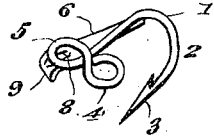
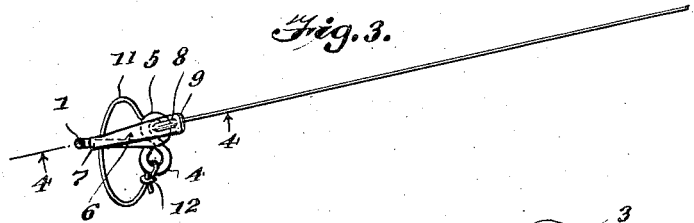
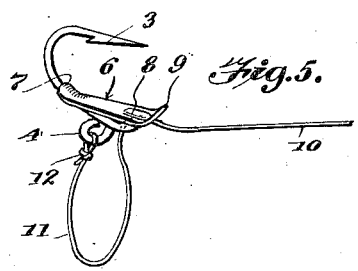
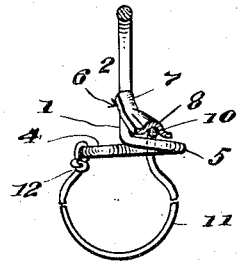
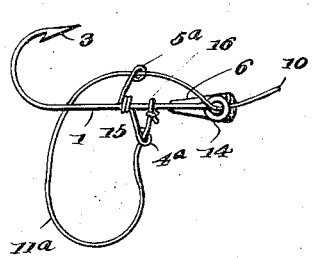
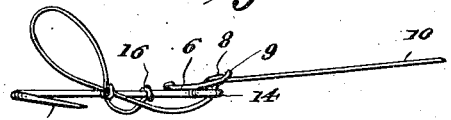
Inventor,
CHARLES R. COPELAND.

Patented Jan. 10, 1939

2,143,054

UNITED STATES PATENT OFFICE 2,143,054

LIVE BAIT FISHHOOK

Charles R. Copeland, Los Angeles, Calif., assignor of forty-five per cent to Svend C. Olsen, Los Angeles, Calif.

Application July 5, 1938, Serial No. 217,552

6 Claims. (Cl. 43—40)

This invention relates to a live bait fish-hook.

An object of the invention is the production of a simple and efficient hook device which will hold live bait to or upon the hook without hooking or injuring the bait, thus prolonging life and activity of the bait.

Another object of the invention is the provision of a simple and efficient brake means, acting upon the leader of the device, whereby the live bait can be efficiently held within a loop, while the line is being cast, or while the fisherman is waiting for a bite or strike.

A still further object of the invention is the construction of a live bait hook in which the main line or leader, as the case may be, is the sole means for forming a bait-retaining loop directly upon the hook itself.

With the foregoing and other objects in view, my invention comprises certain novel constructions, combinations, and arrangements of parts as will be hereinafter fully described, illustrated in the accompanying drawing, and more particularly pointed out in the appended claims.

In the drawing:

Figure 1 is a view in side elevation of a device constructed in accordance with the present invention.

Figure 2 is an inverted perspective view of the device, showing the leader or line removed therefrom.

Figure 3 is a sectional view taken on line 3—3, Figure 1, and looking in the direction of the arrows.

Figure 4 is a sectional view taken on line 4—4, Figure 3, and looking in the direction of the arrows.

Figure 5 is a perspective view of the device.

Figure 6 is a sectional view taken on line 6—6, Figure 4, and looking in the direction of the arrows.

Figure 7 is a view in side elevation of another embodiment of the present invention, while Figure 8 is a top plan view of the same.

Referring to the drawing by numerals to the preferred embodiment shown in Figures 1 to 6, 1 designates the shank of the hook device 2, which shank 1 is provided at its outer end with barb 3. The inner end of shank 3 is formed into the shape of a transverse S unit, comprising primary eye 4 and auxiliary eye 5. A spring drag or brake 6 extends longitudinally of the shank 1, with its inner end slightly bent or wrapped around the shank, as shown at 7, Fig. 5. The brake 6 is secured at its inner end to said shank 3 by any suitable means, such as soldering or welding said brake to said shank. Near the outer end of the elongated spring brake 6 is a longitudinally extending inverted cup or groove portion 8; the extreme outer end of the spring brake 6 is slightly bent up or outwardly, as at 9, to enable the operator to easily raise the outer end of the spring brake 6 slightly away from the shank and its eyes, when desired.

The leader or line 10 is threaded through the auxiliary eye 5, passing under brake spring 6, through the elongated grooved portion 8 and then is folded into a loop 11, with the outer end of the loop tied, as at 12, to the primary eye 4. The operator can easily adjust the loop around the live bait, indicated by dotted lines 13, Fig. 1, and then by gently pulling outwardly upon the leader 6, the loop can be made to efficiently hold the live bait in position, with the excellent brake 6 retaining the loop so positioned, and this brake 6 is sufficiently strong to allow casting or throwing of the line by the fisherman, without the size of the loop being altered after manual adjustment, whereby the bait is not injured, and thus the life of the bait and its activity is greatly prolonged.

The longitudinally extending guiding groove 8 of spring brake 6 prevents the line or leader 10 from being cut, during its sliding action, thereby greatly increasing the life of the leader, while at the same time, the loop 11 is maintained in the position created by the operator.

In the embodiment shown in Figures 7 and 8, the shank 1 is provided at its outer end with an eye 14. The shank 1 is also provided with a transverse unit 15; said unit 15 is provided with a primary eye 4a and an auxiliary eye 5a. The elongated spring brake 6 is secured at its inner end to shank 1, with the cup or elongated groove portion 8 over the eye 14. The leader or line 10 is threaded through eye 14 and then is threaded through auxiliary eye 5 and then is threaded through primary eye 4a and is preferably fastened at 16 to shank 1. Of course, the leader may be fastened directly to the primary eye 4a, as in the preferred embodiment Figures 1 to 6, if the operator so desires. A loop 11a is formed, and the operator can adjust the loop around the live bait 13, dotted lines Fig. 1, and by reason of the spring brake 6 acting upon the leader 10, the loop will stay in the same form created by the operator. It will, therefore, be seen that in this embodiment I have shown a device quite similar to the preferred embodiment; this device employs on the shank a transverse double eye unit engaged by a leader or line, which leader is formed into a loop, and the size of the loop is fixed by the operator and is so retained by the novel spring brake on the shank.

While I have described the preferred embodiments of my invention and illustrated the same in the accompanying drawing, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a device of the class described, the combination of a shank provided at its outer end with leader-receiving means, brake means on said shank and registering with said leader-receiving means at the outer end of said shank, and a leader extending beyond the outer end of said shank and being threaded through said leader receiving and under said brake means and formed into a loop supported by said shank.

2. In a device of the class described, the combination of a shank, said shank being provided at its outer end with eye-means, a spring brake secured at its inner end to said shank and extending over said eye-means, a leader under said spring brake and threaded through said eye-means, and said leader and shank being provided with means for supporting a portion of said leader in a looped condition.

3. In a device of the class described, the combination of a shank, said shank being provided at its outer end with eye-means, an elongated spring brake secured at its inner end to said shank, said spring brake being provided near its outer end with a cup or grooved portion over said eye-means, a leader in said grooved portion and threaded through said eye means and provided with a loop contiguous to said shank, and means attaching one end of said loop to said shank.

4. In a device of the class described, the combination of a shank, said shank being provided at its outer end with eye-means, an elongated spring brake partly encircling at its inner end said shank, said spring brake being provided at its outer end with a longitudinally extending groove portion and with an outwardly bent extension on its extreme outer end, said groove portion extending across said eye-means, a leader or main line beyond said shank and its eye-means and having a portion threaded through the eye-means and formed into a loop, said leader having a portion thereof in said groove portion, and means attaching one end of said loop to said shank.

5. In a device of the class described, the combination of a shank having its outer end bent into a substantially S-shape unit extending transversely of said shank, said S-shape unit comprising a primary and an auxiliary eye, brake means on said shank and extending across said auxiliary eye, a leader threaded under said brake means and through said auxiliary eye and formed into a loop, and the inner end of said loop tied to said primary eye.

6. In a device of the class described, the combination of a shank provided at its outer end with an eye, an eye-unit including a primary and an auxiliary eye formed of a single piece of material and secured around said shank intermediate its ends, an elongated spring brake secured to said shank over the eye at its outer end, and a leader extending beyond said shank and eye and threaded under said spring brake and through the eye at the outer end of said shank and through the auxiliary eye and the primary eye of the eye-unit, and the inner end of said leader tied or fastened to said shank between said eye-unit and said spring brake.

CHARLES R. COPELAND.